United States Patent [19]

Guhl et al.

[11] Patent Number: 4,828,020

[45] Date of Patent: May 9, 1989

[54] INTERNAL FINNED HEATER-COOLER FOR AN EXTRUDER BARREL

[75] Inventors: Paul J. Guhl, Noank; Albert P. Brown, Gales Ferry, both of Conn.

[73] Assignee: Crompton & Knowles Corporation, Stamford, Conn.

[21] Appl. No.: 897,390

[22] Filed: Aug. 15, 1986

[51] Int. Cl.⁴ .......................... F25B 29/00; H05B 3/02
[52] U.S. Cl. ....................................... 165/64; 425/144; 264/40.6; 219/535; 219/550
[58] Field of Search ...................... 165/64, 30, 61, 122, 165/124; 366/146, 149, 145; 425/143, 144, 378 R, 379 R; 264/40.6; 219/535, 550

[56] References Cited

U.S. PATENT DOCUMENTS

| | | | |
|---|---|---|---|
| 2,541,201 | 2/1951 | Buecken et al. | 264/40.6 |
| 2,721,729 | 10/1955 | Van Riper | 165/64 |
| 2,893,055 | 7/1959 | Wenzel | 165/64 |
| 3,167,812 | 2/1965 | Bennigsen | 165/30 |
| 3,218,671 | 11/1965 | Justus et al. | 425/144 |
| 3,285,329 | 11/1966 | Finn | 165/61 |
| 3,317,958 | 5/1967 | Stroup et al. | 165/64 |
| 3,353,212 | 11/1967 | Nelson et al. | 165/124 |
| 3,727,678 | 4/1973 | Schott, Jr. | 165/64 |
| 3,730,262 | 8/1971 | Drugmand | 165/64 |
| 3,743,252 | 7/1973 | Schott, Jr. | 366/145 |
| 3,933,200 | 1/1976 | Cunningham | 165/64 |
| 4,072,185 | 2/1978 | Nelson | 165/30 |
| 4,504,734 | 3/1985 | Piazzola | 219/535 |
| 4,558,210 | 12/1985 | Leary | 219/535 |
| 4,565,921 | 1/1986 | Piazzola | 219/535 |
| 4,628,191 | 12/1986 | Piazzola | 219/550 |
| 4,634,361 | 1/1987 | Piazzola | 165/122 |

FOREIGN PATENT DOCUMENTS

| | | | |
|---|---|---|---|
| 1149161 | 12/1959 | Fed. Rep. of Germany | 165/64 |
| 2145067 | 3/1973 | Fed. Rep. of Germany | 219/535 |
| 657097 | 10/1963 | Italy | 165/64 |
| 502181 | 3/1971 | Switzerland | 425/378 R |
| 420475 | 8/1974 | U.S.S.R. | 425/144 |
| 994356 | 6/1965 | United Kingdom | 165/64 |
| 1163860 | 9/1969 | United Kingdom | 219/535 |

Primary Examiner—Albert W. Davis, Jr.
Assistant Examiner—John K. Ford
Attorney, Agent, or Firm—Bernard F. Crowe

[57] ABSTRACT

A Heater-Cooler unit that provides efficient heating and cooling in such a manner that the temperature is easily controlled. The unit's 360 degree exposure enables both fins and barrel surface to be in complete contact with cooling air. The structure of the fins provides contact with the barrel to conduct heat flowing from the heating elements to the barrel surface.

11 Claims, 2 Drawing Sheets

INTERNAL FINNED HEATER-COOLER FOR AN EXTRUDER BARREL

This invention relates generally to a temperature control apparatus for extruders that provides efficient heating and cooling of an extruder unit in such a manner that temperature is easily controlled. The cylindrical Heater-Cooler consists of two halves split axially, each having circumferential fins that span the air gap in the halves. A blower provides air cooling between the fins, which create faster cooling due to increased surface area. Also, the electrical heating elements embedded within the outer wall of the Heater-Cooler permit controlled heating when necessary.

Existing, external fin units require a close fitting shroud to force air through the fins. To cool the barrel with an external fin unit you must pass the air over the fins to remove heat conducted from the barrel through the external heater block which results in a slower response time to control temperature. U.S. Pat. No. 4,072,185 to Nelson, illustrates a design with air cooled fins, some of which extend from core to the outside diameter.

U.S. Pat. No. 4,565,921 to Piazzola issued Jan. 21, 1986 discloses a design that appears to have fins that span the radial distance from an outer casing to the extrusion cylinder about which the Piazzola device is wrapped. The fins however, have annular cooling ducts extending therethrough, unlike the solid fins of the applicant.

Existing internal fin units will produce cold spots both at the top and bottom of the barrel which result from the fins ending at the edge of the air passage entrance and exit. Applicants' 360 degree design cools evenly and produces a faster response time through direct air contact with the barrel. Also the applicants' 360 degree design removes heat not only from the fins but also from direct air contact with the barrel.

SUMMARY OF THE INVENTION

It is the primary object of this invention to provide more efficient cooling by having both the fins and the barrel surface in complete contact with cooling air for a continuous 360 degree exposure.

A further object of this invention is to provide a lower cost system by eliminating the outer shroud of the barrel and providing the internal heating and cooling system which is more efficient and economical. The cooling air is allowed to pass through the space between the fins and have a direct 360 degree contact with the barrel wall.

The principal object of the preferred invention is accomplished by a device consisting of two cylinderical halves split parallel to the axis. Each half, cast from aluminum, has an outer surface that is completely smooth. The inside has circumferential fins cast to the part and these fins are arranged to continue radially out to the outside diameter of the Heater-Cooler at the split side of the halves. The depth of the fins are similar to the radial depth.

Electrical heating elements are cast into the halves in a manner to cause heat to be generated evenly throughout the unit.

The two halves are strapped over the barrel or a similar object. The inside diameter is machined to present a close fit to the extruder barrel. This fit is a surface on the inner tops of the fins. The structure of the fins thickness and depth, is so designed as to provide adequate contact with the barrel to conduct heat from the heating elements to the barrel surface. The heating elements are cast into the Heater-Cooler structure whose structure is preferably aluminum.

Application of the above invention is accomplished as follows. The extruder is started and the electrical energy is switched on to the applicants' Heater-Cooler. When the desired temperature is reached, the power is switched off. However, in the case of over-ride or heat generated in the barrel causing the temperature to exceed the set point, a blower directs air through the internal finned entrance. The air is then allowed to pass through the circumferential fins, over the barrel, 180 degrees on each side whereupon the air is finally allowed to exit through a finned portal which typifies the finned entrance.

No extra shrouding is required and the blower with its adapter is positioned at the entrance side of the heater assembly.

BRIEF DESCRIPTION OF THE DRAWINGS

Further features and advantages of the internal finned Heater-Cooler for easy control of extruder temperature, according to the invention, will be more clearly understood from the following detailed description of a preferred embodiment thereof, with reference to the accompanying illustrative drawing, where.

DESCRIPTION OF A PREFERRED EMBODIMENT

Figure 1:
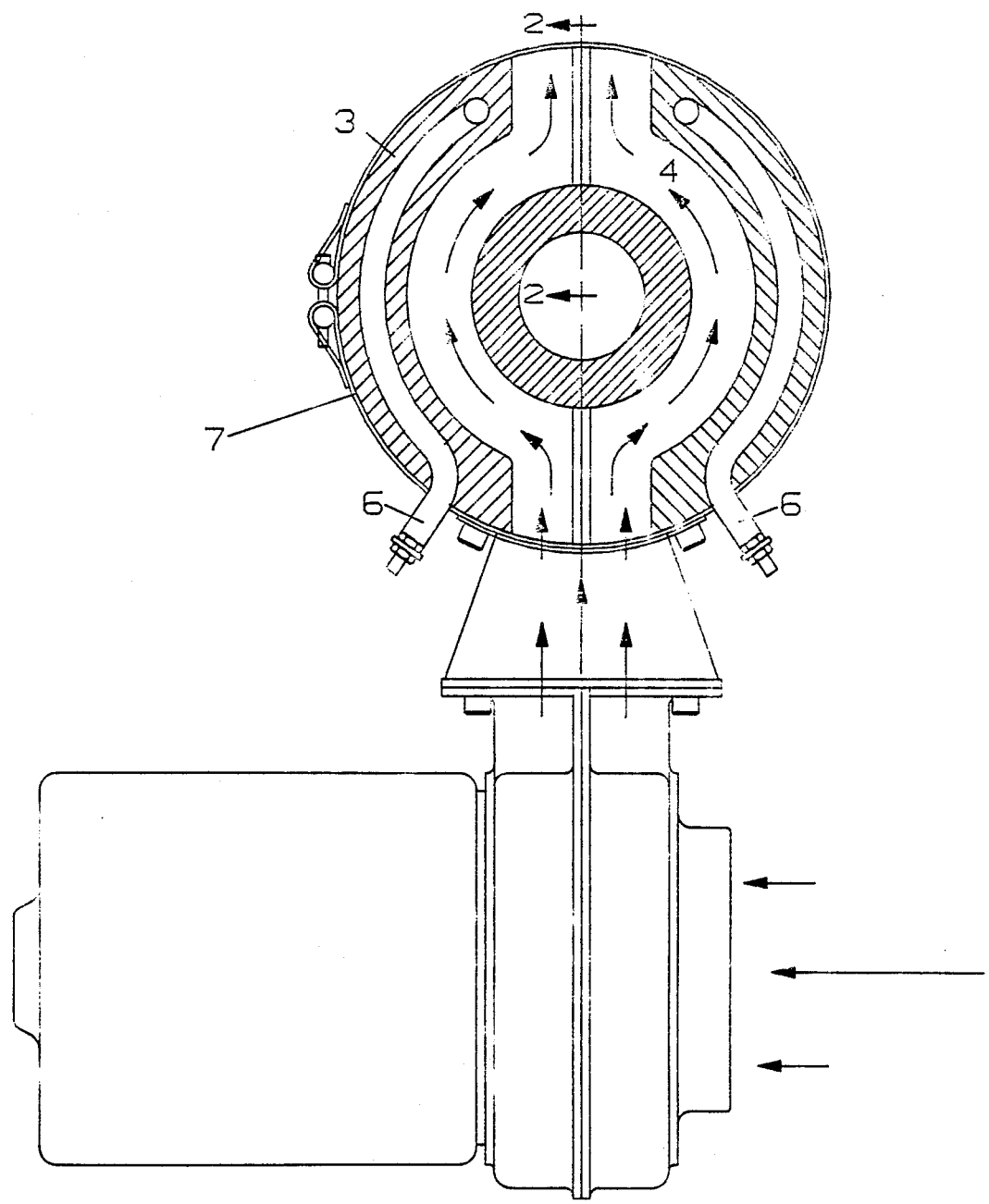
FIG. 1 is a cross-sectional view at a right angle to the axis of the barrel taken along line 1—1 of FIG. 2 and looking in the direction of the arrows.
Figure 2:
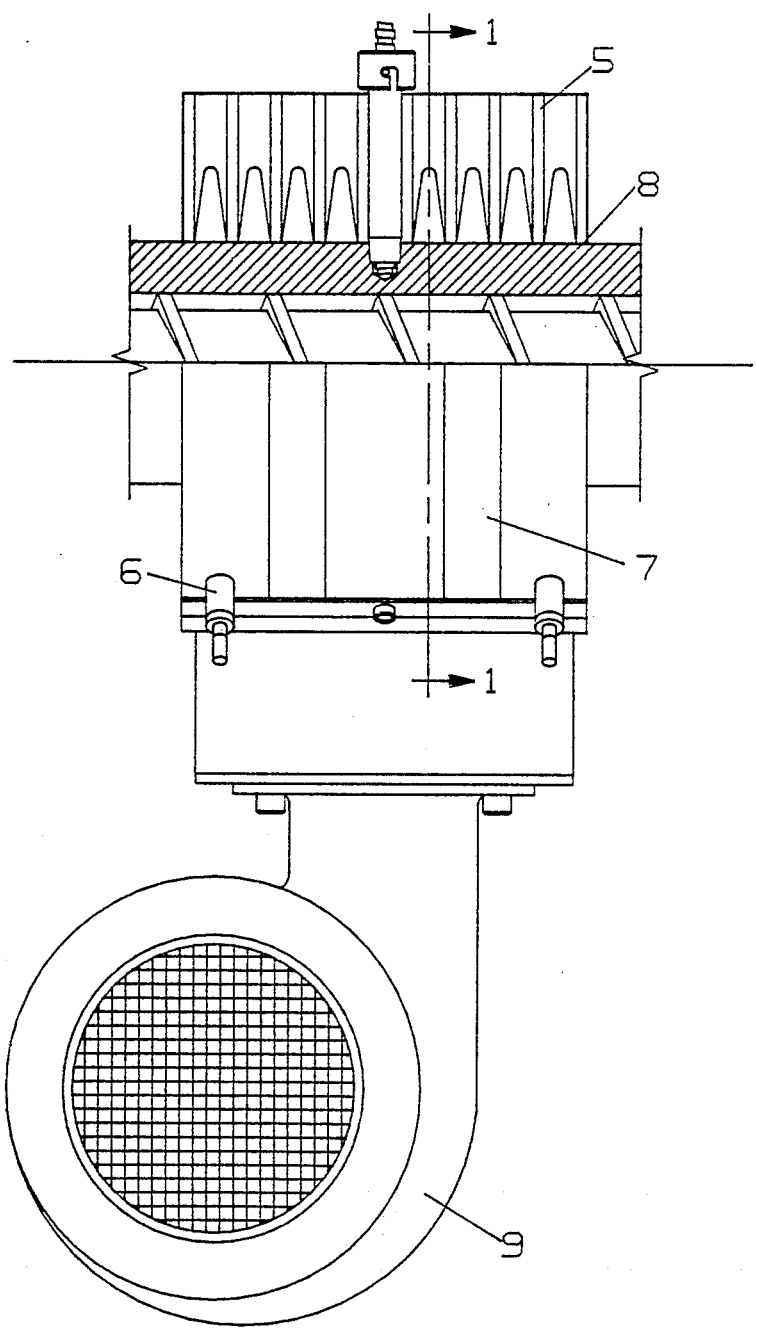
FIG. 2 is a cross-section taken through the axis of the barrel along line 2—2 of FIG. 1 and looking in the direction of the arrows.

Referring in particular to the reference numerals used in the views of the accompanying drawing, this Heater-Cooler for easy control of extruder temperature comprises a blower 9 which discharges air into the passageway around barrel surface 4. The cooling air passes over fins 5, which creates more surface area for faster cooling. Likewise, when heater element 6 is in the on condition, heating results from contact of the fins with the barrel surface.

Heater Element 6, cast within the Heater-Cooler casting 3, if switched to the on condition imparts heat to the fins 5. Heat is transferred to the barrel surface 4 by the fins contacting surface 8 and by the process of radiation of the Heater-Cooler.

The heater cooler is attached to the barrel by straps 7. The straps 7 are made out of steel or other ferrous material which has a lower thermal expansion than the Heater-Cooler material. The casting 3 is preferably made out of aluminum or other non-ferrous material that has a high thermal conductivity.

Of course, the internal Heater-Cooler has been described and illustrated herein by way of example and not of limitation for the sole purpose of showing its productivity and general features, and the same may be altered and modified as may occur to a skilled person in the art, without departing from the true scope of the invention.

I claim:

1. An internal finned heater-cooler for precise temperature control of an extruder barrel having a longitudinal axis comprising:

(a) a casting with two halves split axially, each half having a set of internal circumferential fins placed along a circumferential inner periphery of each half and oriented perpendicular to the axis of the extruder barrel, said fins having a radial depth spanning an air gap defined by the halves between an outer semicylindrical section within each half and the barrel outer surface;

(b) means to force cooling air between the fins; and against the barrel from a common inlet located at one axial split to a common outlet located at the other axial split;

(c) at least one electrical heating element embedded within the outer wall of the casting causing heat to be generated evenly throughout the heater-cooler;

(d) means to attach the heater-cooler casting to the barrel.

2. An internal finned heater-cooler as set forth in claim 1 characterized in that inside each half, said fins are cast into the heater-cooler, arranged to continue radially out to the outside surface of the heater-cooler at the split side of the halves, with a depth similar to the radial depth of said gap.

3. An internal finned heater cooler as set forth in claim 1 comprising semicylindrical halves.

4. An internal finned heater-cooler as set forth in claim 1 characterized in that said fins span the entire 180° of each inside half.

5. An internal finned heater-cooler as set forth in claim 1, wherein said means for forcing cooling air comprises a blower to force air between the fins and over the barrel surface.

6. An internal finned heater-cooler as set forth in claim 1 comprising a casting of a non ferrous material with high thermal conductivity.

7. An internal finned heater-cooler as set forth in claim 1 comprising at least two straps to attach the heater-cooler to the barrel.

8. An internal finned heater-cooler as set forth in claim 7 characterized in that the straps are ferrous material which has a lower thermal expansion than the material of the heater-cooler.

9. An internal finned Heater-Cooler as set forth in claim 1 characterized in that each half is smooth on the outside.

10. An internal finned heater-cooler as set forth in claim 6 wherein the non ferrous material is aluminum.

11. An internal finned heater-cooler as set forth in claim 8 wherein the ferrous material is steel.

* * * * *